Nov. 17, 1964 W. J. HARRISON 3,157,471
AUTOMATIC TITRATOR
Filed Sept. 27, 1960 4 Sheets-Sheet 1

INVENTOR.
Walter J. Harrison
BY
Webb Mackey & Burden
HIS ATTORNEYS

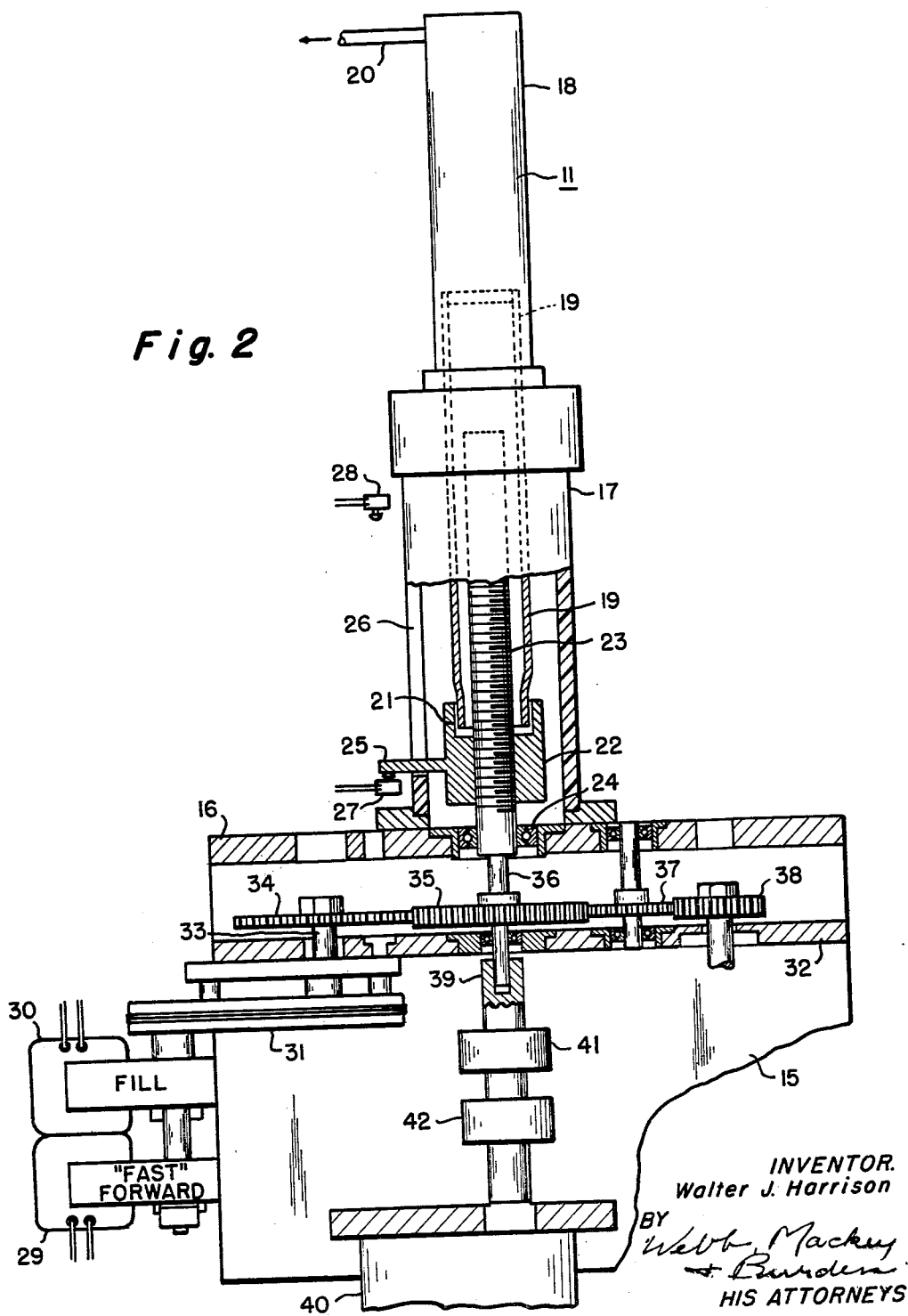

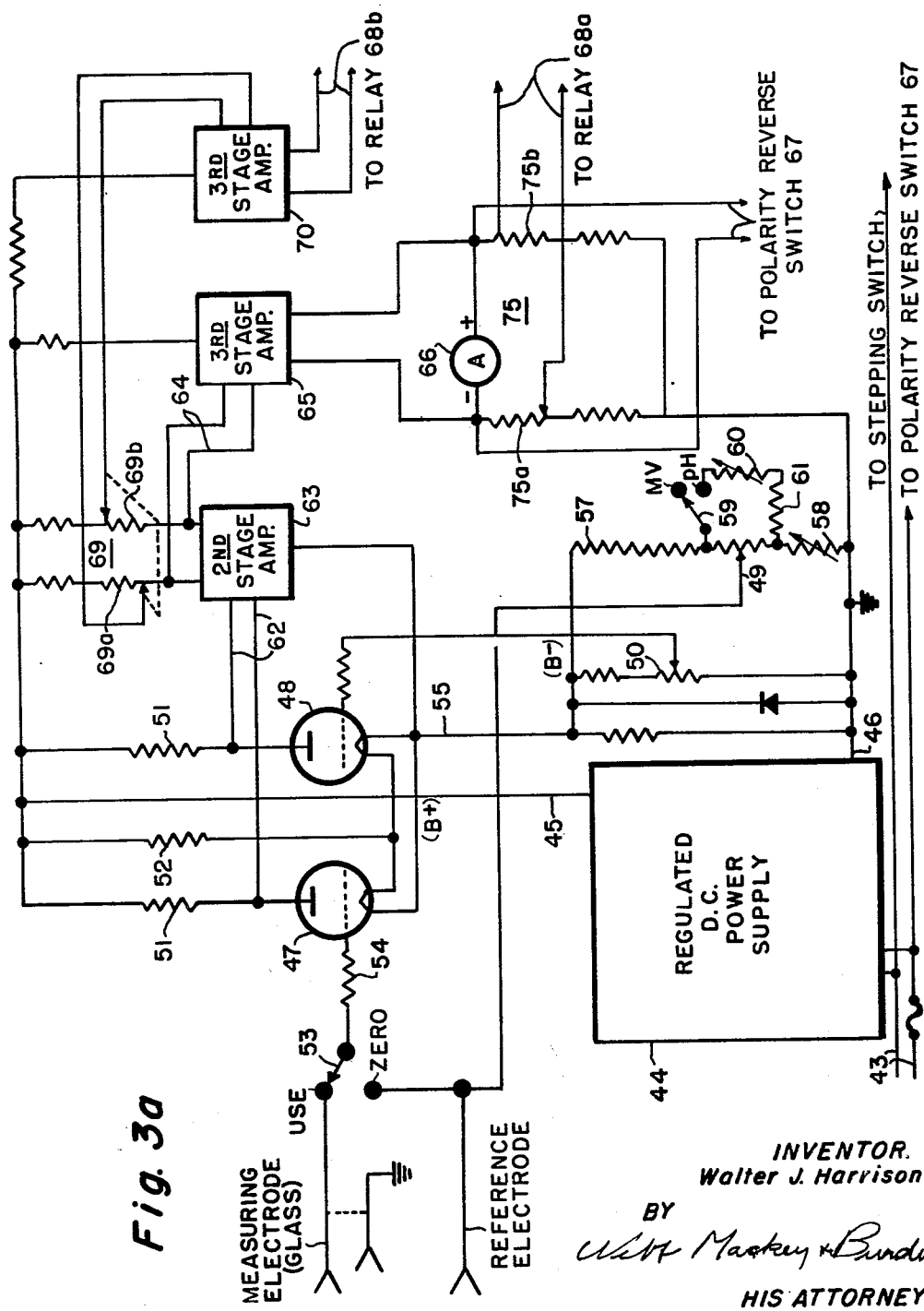

Nov. 17, 1964   W. J. HARRISON   3,157,471
AUTOMATIC TITRATOR
Filed Sept. 27, 1960   4 Sheets-Sheet 4

INVENTOR.
Walter J. Harrison
BY
HIS ATTORNEYS

United States Patent Office 3,157,471
Patented Nov. 17, 1964

3,157,471
AUTOMATIC TITRATOR
Walter J. Harrison, Pittsburgh, Pa., assignor to Fisher Scientific Company, Pittsburgh, Pa.
Filed Sept. 27, 1960, Ser. No. 58,723
2 Claims. (Cl. 23—253)

This application relates to an automatic titrator and, more particularly, to apparatus which may be used to add titrant to a reaction cell until a desired end point is reached, which stops automatically when the end point has been reached, and which records the amount of titrant added to obtain the desired end point. My invention is particularly useful in carrying out automatic analyses in chemical processes and, therefore, it will be described with reference thereto, although it is to be understood that it has other important uses.

A typical industrial analysis which is made while a chemical process is being conducted is the analysis of sodium aluminate liquors during the processing of aluminum ores to determine the amount of the following ingredients: caustic, sodium carbonate and alumina. In such analysis, the following steps are carried out:

Step 1.—A 50 ml. pipet fills with 25% sodium gluconate.

Step 2.—A 2 ml. sample of liquor is removed from the production line and flushed into a reaction cell with water. Sodium gluconate is also added to the cell.

Step 3.—Nitrogen is bubbled through the mixture and a potentiometric titration with N/2 hydrochloric acid is performed to an equivalent point at pH 8.1.

Step 4.—The result of the titration is recorded and represents the total caustic plus one half of the sodium carbonate present.

Step 5.—A measured excess of hydrochloric acid is added. A 50 ml. pipet is filled with sodium hydroxide solution exactly equivalent to the excess hydrochloric acid. Nitrogen sweeps the cell for two minutes to remove $CO_2$.

Step 6.—Sodium hydroxide is introduced into the cell. A 50 ml. pipet is filled with 30% potassium fluoride solution.

Step 7.—A second titration is performed with N/2 hydrochloric acid to pH 8.1.

Step 8.—The result is recorded and represents one half of the sodium carbonate present in the sample. The potassium fluoride is introduced into the reaction mixture.

Step 9.—A third titration is performed with hydrochloric acid to pH 8.1.

Step 10.—The result is recorded and represents the alumina present.

My invention relates to apparatus for carrying out those steps of the process wherein hydrochloric acid is added to carry out potentiometric titrations and to record the amount of hydrochloric acid which was added to produce the desired equivalence point.

In the accompanying drawings, I have illustrated certain presently preferred embodiments of my invention, in which:

FIGURE 2 is a front elevation partially in section of apparatus for dispensing titrant solutions in measured volumes;

FIGURES 3a and 3b are two parts of an electrical diagram showing the electrical circuit which I have invented for controlling the operation of the apparatus shown in FIGURE 2.

Figure 1:
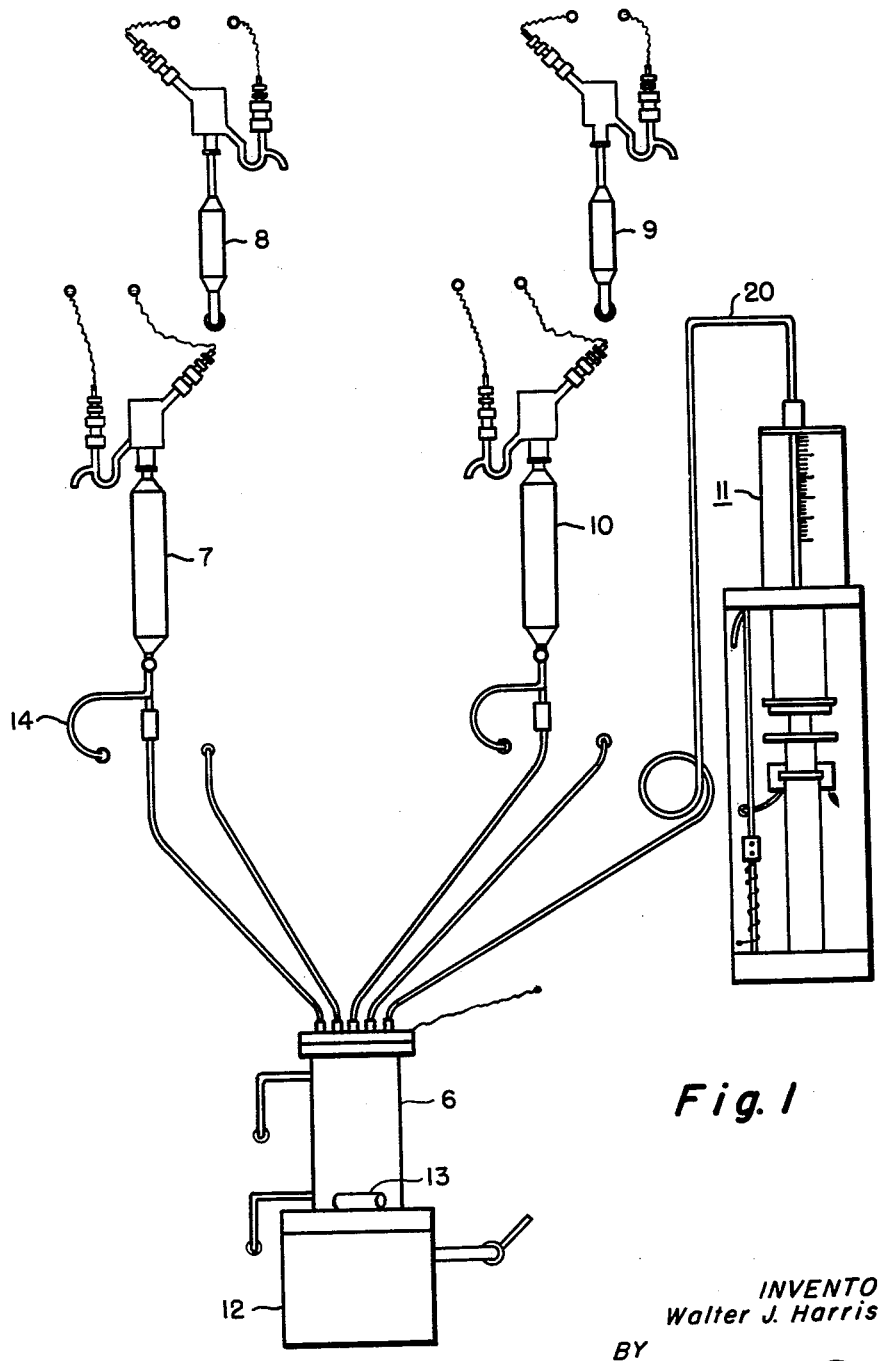
FIGURE 1 is a front elevation of part of an automatic analyzer in which my invention is used.

Referring to FIGURE 1, this figure shows the arrangement of apparatus which may be used to carry out the analysis of sodium aluminate liquor which was outlined above. The apparatus includes a reaction cell 6, automatic pipets 7, 8, 9 and 10, and a motor-driven syringe designated generally by the reference number 11 which is used to add titrant to the reaction cell 6 at the proper times. The reaction cell 6 rests on a magnetic stirrer 12 which consists of a motor-driven bar magnet which rotates in a horizontal plane beneath the bottom of the reaction cell 6 and carries with it a glass-encased bar magnet 13 which rotates inside the cell.

All of this apparatus is mounted on the side of a vertical panel not shown in FIGURE 1. A sample inlet 14 upplies a sodium aluminate sample which is to be analyzed to the pipet 7. Pipets 8 and 9 are used to supply sodium gluconate and sodium fluoride, respectively, in measured volumes to the reaction cell 6 from reservoirs of these materials. The pipet 10 supplies measured volumes of sodium hydroxide and the motor-driven syringe 11 supplies the hydrochloric acid for carrying out the titration. A recorder is connected to the syringe drive to record the amount of hydrochloric acid which was added during the titration.

All of the pipets are filled and emptied by three-way valves which are motor-driven and which at the appropriate time are turned to fill the pipet, stop the supply of liquid to a pipet and empty the pipet. Control means for stopping the flow of liquid to a pipet is described and claimed in my co-pending application Serial No. 54,738, filed September 8, 1960. The pipets are filled and emptied in sequence established by a stepping switch which, in turn, is actuated by signals received from the various elements of the apparatus after they have completed a required step. The stepping switch also initiates the operation of the syringe 11, but the switch forms no part of the present invention since the syringe can be initiated by any suitable switch or timing mechanism.

FIGURE 2 of the drawings shows the construction of the syringe 11 and of the syringe drive. A hollow base 15 having a top 16 supports a cylindrical base 17 which, in turn, supports the syringe 11. The syringe comprises a cylinder 18 in which a plunger 19 is raised and lowered to fill the syringe and dispense titrant from the syringe into the reaction cell through a connecting pipe 20. The plunger 19 is a glass cylinder closed at its upper end within the cylinder 18 and resting at its lower open end in a recess 21 formed in the top of a traveling nut 22.

The nut 22 rides on a lead screw 23 which is mounted in bearings 24 in the top 16 for rotation about a vertical axis. The lead screw is turned in one direction to raise the nut 22 and the plunger 19 in the cylinder 18, and thereby dispense titrant from the cylinder 18, and turned in the opposite direction to lower the plunger 19 and thereby fill the cylinder 18. To prevent the nut 22 from turning with the lead screw 23, the nut has an arm 25 which extends out through a vertical slot 26 in the side of the cylinder base 17. A lower limit switch 27 and an upper limit switch 28 are positioned in the path of travel of the arm 25 adjacent each end of its path of travel. The lower limit switch 27 forms part of a circuit which I have invented for taking up slack in the gearing which connects electric motors with the lead screw 23 when the plunger changes from a fill to a dispense stroke. This circuit is described and claimed in my copending application Serial No. 191,676, filed April 24, 1962, as a continuation of my application Serial No. 54,791, filed September 8, 1960, now abandoned. The upper limit switch 28 is added as a safety measure.

By means of a circuit which will be later described, the syringe on a dispense stroke is first driven relatively rapidly. When, however, it nears the desired end point of the titration being conducted, the drive for the lead screw is shifted from a relatively fast motor to a slow servo motor which turns with decreasing speed as the end point is approached, the speed of this servo motor also being controlled by the electric circuit hereinafter described. On the return or "fill" stroke, the lead screw is driven by a third motor which runs faster than the first motor.

Referring to FIGURE 2, a motor 29 and a motor 30 are connected to a common gear reducer 31, motor 29 being used on the fast drive of the syringe during the dispensing stroke and motor 30 being used to drive the syringe in the opposite direction during the fill stroke. A platform 32 extending beneath the top 16 supports gears which connect the gear reducer 31 with the lead screw 23. A shaft 33 extending from the gear reducer 31 carries a gear 34 which meshes with a gear 35 mounted on an extension 36 of the lead screw 23. The gear 35 also meshes with an idler gear 37 which, in turn, drives a gear 38. The shaft on which the gear 38 is mounted can be directly connected to conventional recording mechanism whereby the amount of titrant dispensed from the cylinder 18 during upward movement of the piston 19 can be recorded. Alternatively, the shaft on which the gear 38 is mounted can drive a synchro-transmitter connected electrically to a recorder. Since both recording arrangements are conventional, they are not shown.

The extension 36 of the lead screw 23 extends beyond the gear 35 into a shaft 39 mounted for rotation in the platform 32 directly beneath the lead screw. The shaft 39 is connected to the extension 36 and is driven by a servo motor 40 through a magnetic clutch 41 which is provided to insure that the motor 40 is not driven by either of the motors 29 or 30. The clutch is energized only when motor 40 is activated. To prevent reverse rotation of the screw if the motor 40 should reverse, if an end point is exceeded, a one-way drive 42 is placed between the motor and the magnetic clutch.

Figure 3B:
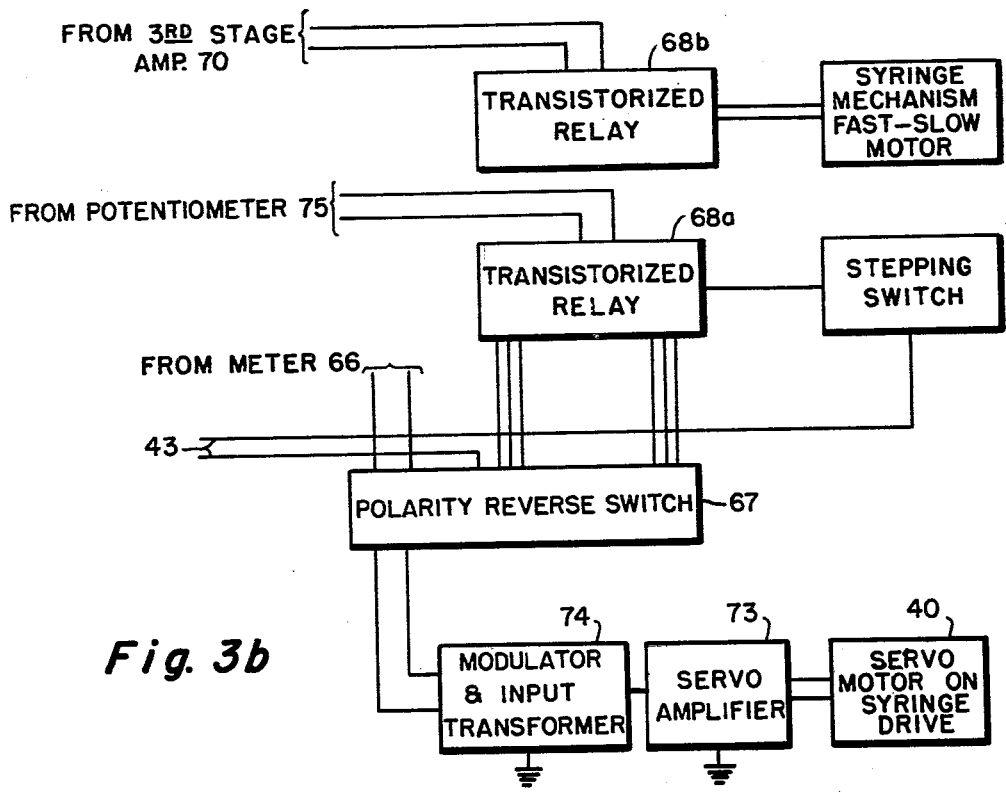

FIGURES 3a and 3b comprise an electrical diagram of the circuit which I have invented to control the operation of the syringe as described above. Two electrodes are inserted in the reaction cell to measure the hydrogen ion concentration present during the titration. One electrode is a reference electrode, for example, a calomel electrode, and the other electrode is used as the measuring electrode and is usually a glass electrode. A fixed voltage is applied to the reference electrode to bring the operating voltage of the triode 47 into the straight line portion of the characteristic curve of the triode. The input voltage from the reaction cell is added to the fixed voltage and is applied against the known voltage input of the desired end point plus the fixed voltage. The difference between these opposed voltages is amplified and fed to relays which control the motors of the syringe drive. When the difference between the opposed voltages is zero, no signal passes through the circuit, and the servo motor which is then driving the plunger in the syringe stops. As the two voltages approach each other, their difference decreases and the circuit is such that the servo motor decreases in speed proportionately as the end point is approached. The motor which drives the syringe plunger on the fill stroke is energized by the stepping switch which programs the entire analysis.

Referring to FIGURE 3a, power for energizing the circuit and the motor drive for the syringe comes from a source of alternating current 43, and direct current voltage to be applied to the electrodes is supplied by a conventional D.C. power supply 44 having one stage of regulation and an outlet lead 45 which is the "B+" lead and a lead 46 which is the conventional "B−" or ground lead.

The input voltage from the reaction cell plus the fixed voltage is opposed to the known voltage of the end point desired plus the fixed voltage in the triodes 47 and 48 which form the first stage of amplification. The difference between their plate voltages provides a signal which is the difference between the opposed voltages after being amplified.

The plate, filament and grid voltages are supplied by a circuit for supplying a stable D.C. voltage. This circuit is described and claimed in the co-pending application of Donald T. Biel, Serial No. 300,142, filed August 2, 1963, as a continuation of Donald T. Biel application, Serial No. 54,739, filed September 8, 1960, now abandoned, which has been assigned to the assignee of this application. The circuit includes a potentiometer 49 which applies a fixed voltage to the reference electrode, and a potentiometer 50 which supplies grid voltage to the triode 48. The circuit also supplies plate voltage through plate load resistors 51 and filament current through the resistor 52.

As shown in FIGURE 3a, the switch 53 is provided with a "Use" position and a "Zero" position. To use the circuit to stop the syringe drive when the desired end point has been reached in the reaction cell, the switch 53 is set to the "Use" position and a buffer solution having a known pH which is close to the pH of the titration at its end point is placed in the reaction cell. The potentiometer 49 is set so its dial reads at the pH of the buffer solution. The input voltage of the reaction cell is added to the voltage applied by potentiometer 49, so that the actual grid to cathode voltage in the triode 47 is the sum of these two voltages. The potentiometer 50 is then adjusted so that a meter circuit (subsequently described) shows that the plate voltages in triodes 47 and 48 are equal. That means that there is a grid to cathode voltage in triode 48 equal to the input voltage of the reaction cell plus the voltage imposed on the reference electrode by the setting of the potentiometer 49.

The buffer solution is removed and a titration started in the reaction cell after the potentiometer 49 has been set to the desired end point of the titration being conducted. When the reaction has proceeded so that its voltage input plus the fixed voltage equals the grid cathode voltage set in tube 48 by the potentiometer 50, the plate voltages in triodes 47 and 48 are equal, thus indicating that the desired end point has been reached. A "Zero" signal is read by other portions of the circuit (to be subsequently described) and the drive for the syringe is stopped.

As shown in FIGURE 3a, the potentiometer 49 is connected in series with a resistance 57 which acts as a voltage divider and with a variable resistance 58 which is used as a calibrating resistance and can be adjusted so that a dial on the potentiometer 49 can be read directly in mv. when a switch 59 is in the mv. position shown in FIGURE 3a. When the switch 59 is thrown to the "pH" position, a variable resistance 60 can be adjusted so that the scale on the potentiometer 49 reads directly in pH. A resistance 61 is connected in series with the resistance 60 to increase the sensitivity of the resistance 60.

The output of the first stage of amplification is led by lines 62 to a conventional second stage amplification 63. The output of the second stage is split. Part goes through leads 64 to a third stage amplification 65, the output of which goes to an ammeter 66. The output of the third stage of amplification 65 also passes through a polarity reverse switch 67 and then to a transistorized relay 68a. This relay is triggered when the ammeter 66 shows no current deviation which means that the plate voltages in the triodes 47 and 48 are equal and that the titration is at an end. Triggering this relay actuates the stepping switch which, as earlier explained, programs the entire analysis procedure.

It has been explained that during the titration the syringe is first driven by a fast motor until the end point of the titration is approached, whereupon the drive for the syringe is shifted from the fast motor to a servo motor which not only moves slowly, but which decreases in speed as the end point is approached and finally stops when the end point is reached. The shift from the fast motor is accomplished by triggering another transistorized relay 68b which is part of a circuit which will now be described.

Going back to the second stage of amplification 63, part of its output goes to a dual potentiometer 69 having two arms 69a and 69b, which arms are wound in opposition so that when the potentiometer is adjusted, the resistance of one arm increases while the resistance of the other arm decreases. The potentiometer 69 forms part of the plate load of the second stage of amplification 63 so that when the plate voltages in the tubes 47 and 48 are equal, and when the arms 69a and 69b of the potentiometer are set at their mid-points, there is no voltage between the contact points of the two arms of the potentiometer 69 and no signal passes to a third stage of amplification 70 which is connected to the output of the dual potentiometer 69. The output of the third stage of amplification 70 goes to the relay 68b which switches the syringe drive from the "fast" motor to the servo motor as will be described with reference to FIGURE 4 of the drawings.

When the dual potentiometer 69 is moved from its mid-point, a voltage is developed between the contact points of the two arms of the potentiometer. This voltage is applied to the third stage amplification 70 which triggers the relay 68b. Thus, by means of this circuit, this potentiometer 69 can be arranged to trigger the transistor relay on either side of the balance point of the plate voltages in the tubes 47 and 48 and thereby the syringe drive is changed from the fast motor to the servo motor at a point in advance of the end point of the titration which is determined by the setting of the potentiometer 69.

Figure 4:
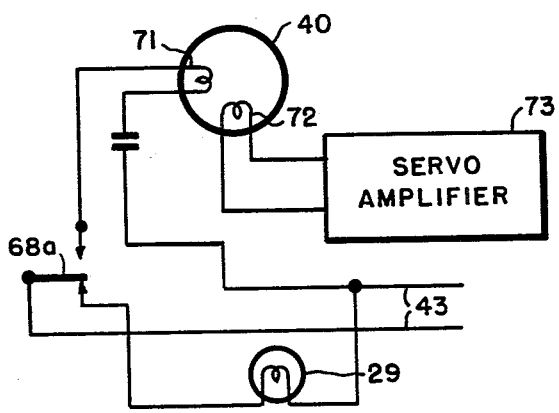
FIGURE 4 is an electrical diagram showing the connections between certain parts of the apparatus shown in FIGURE 3b.

FIGURE 4 shows the circuit whereby the relay, when triggered, shifts the drive of the syringe from the fast motor to the servo motor. Referring to FIGURE 4, it will be seen that when the relay is in the position shown in FIGURE 4, it connects the winding of the fast motor 29 with the source of alternating current 43. When the relay is triggered, it connects the line 43 with the main winding 71 of the servo motor 40.

A control winding 72 in the servo motor is controlled by a servo amplifier 73 which is, in turn, controlled by the third stage amplification 65 (see FIGURE 3a). Output from the third stage of amplification 65 passes to the ammeter circuit 66 and then through the polarity reverse switch 67 to a modulator and input transformer 74 which converts the direct current signal received from the third stage of amplification 65 into an alternating current signal which is passed on to the servo amplifier 73. The servo amplifier, in turn, leads to the control winding 72 in the servo motor 40 and thereby controls the operation of the servo motor.

After the syringe drive has been shifted to the servo motor, the difference in plate voltage between the tubes 47 and 48 actually controls the servo motor because, as can be seen from FIGURES 3a and 3b, the servo amplifier 73 reads the same signal from the third stage of amplification 65 as is read by the meter 66. Therefore, as the difference in plate voltage between the tubes 47 and 48 decreases, the servo amplifier 73 will receive a decreasing signal and the servo motor 40 will move at a decreasing speed. When there is no difference in voltage between the plate voltages of the tubes 47 and 48, there will be no signal, no meter deflection, and the servo motor will stop.

Reference has been made to the polarity reverse switch 67 and to the fact that the potentiometer 69 can be adjusted on either side of its end point. The switch and the adjustability of the potentiometer 69 are provided so that an end point desired in a particular titration can be reached from pH values above or below the desired end point.

There are certain reactions which actually never balance the plate voltages in the tubes 47 and 48 because the signal seen by the ammeter 66 and the servo amplifier 73 decreases as the end point is approached, and in certain reactions the voltage supplied by the servo amplifier to the servo motor is so small that the motor will not run. It is, however, necessary to trip the relay 68a to actuate the stepping switch to continue with the analytical cycle being carried on by the apparatus. This is done by adding an arbitrary set point which is close to the desired end point and which acts as an artificial end point and trips the relay. To obtain an arbitrary set point, a second dual potentiometer 75 having arms 75a and 75b is connected into the output of the third stage of amplification 65. The potentiometer 75 operates in exactly the same way as the potentiometer 69. The voltage between the contacts on the two arms is supplied to the relay 68a which is triggered when the difference in voltage becomes zero, which occurs before the titration reaches the true end point of the reaction.

It has been earlier explained that when the apparatus is first set up a buffer solution having a known pH value is placed in the reaction cell and the potentiometer 49 is set to read the known value of the buffer solution. Thereupon, the potentiometer 50 is adjusted until the meter 66 shows a zero deflection. This must be done whenever a glass electrode is used for the first time. Thereafter, the set of electrodes, so used, must be used under the same set of conditions (temperature, range of pH in which the instrument is operating, etc.). This is due to the fact that no two glass electrodes (which are the ones normally used to read pH) give the same potential with respect to a reference electrode. The difference in potential between two glass electrodes measured (under the same conditions) in respect to a reference electrode is known as "electrode asymmetry potential." Because of this asymmetry potential, it is necessary to use a buffer solution having a known pH value when setting up the instrument for the first time.

If the same electrodes are used under the same conditions, it is possible to avoid the use of a buffer solution after the first setting up of the instrument by means of the "Zero" position provided for the switch 53 which is shown in FIGURE 3a. The procedure for using this switch position will now be described.

The switch 53 is first set in the "Use" position. A buffer solution is placed in the reaction chamber, the potentiometer 49 is set at the pH of the solution, and the potentiometer 50 is adjusted to give a "Zero" deflection in the meter 66. If the switch 53 is then turned to the "Zero" position, the electrodes are cut out of the circuit and the meter 66 will show a current deflection. This deflection is caused by the fact that part of the potential from the electrodes in the reaction vessel is used to balance the plate voltages of the tubes 47 and 48; that is, the reaction cell output voltage is included within the voltages which are involved in the balance of the plate voltages in tubes 47 and 48. With switch 53 in the "Zero" position, the reading on the dial of the potentiometer 49 when the circuit is balanced for a second time is noted. The difference between this second reading and the first reading on the dial of the potentiometer 49 when the switch 53 was in the "Use" position is a measure of the asymmetry potential of the particular electrode being tested.

If the same titration is to be carried out at a later date using the same electrodes under the same conditions, the switch 53 is placed in the "Zero" position and the dial of the potentiometer 49 is set at the second reading which was obtained as described above. The instrument is again balanced by setting the potentiometer 50 until the meter 66 shows a "Zero" deflection. Thereafter, the switch 53 is set to the "Use" position and titrations are carried out in the usual manner. The value of this method of balancing the instrument is that it is not necessary to prepare and use a buffer solution having a known pH value each time the same set of electrodes is used to carry out the same titration under the same conditions.

While I have described certain presently preferred embodiments of my invention, it is to be understood that it may be otherwise variously embodied within the scope of the appended claims.

I claim:

1. Apparatus for automatic titrations for analysis of discrete samples comprising a reaction cell in which the samples to be analyzed are placed and in which the titrations are conducted, means for dispensing titrant into said cell continuously at controlled rates, an electric drive for said dispensing means, electrodes in the reaction cell for receiving the electrical output of reactions in said cell during titrations and an electric circuit responsive to said electrical output for driving the dispensing means at a rate which is rapid as compared to the rate at which the dispensing means is driven near the end of the titration until the titration reaches a predetermined point in advance of the end point, for decreasing the speed of said drive after the titration has reached said predetermined point to a rate proportional to the decreasing electrical output from said reaction cell, and for stopping said drive when the output is zero and the end point has been reached.

2. Apparatus for automatic titrations as described in claim 1 in which the electric circuit responsive to the electrical output of the reaction cell has means for applying to said circuit a voltage to decrease the output of the reaction cell, and a relay, said relay being triggered when the algebraic sum of the electrical output and the voltage is zero, said relay when triggered actuating programming apparatus after a titration has been completed.

References Cited in the file of this patent

UNITED STATES PATENTS

| | | |
|---|---|---|
| 2,560,317 | Wallace | July 10, 1951 |
| 2,607,718 | Suthard | Aug. 19, 1952 |
| 2,650,256 | Lingane | Aug. 25, 1953 |
| 2,666,691 | Robinson | Jan. 19, 1954 |
| 2,668,097 | Hallikainen et al. | Feb. 2, 1954 |
| 2,878,106 | Malmstadt | Mar. 17, 1959 |
| 2,898,200 | Karr | Aug. 4, 1959 |
| 2,950,177 | Brown et al. | Aug. 23, 1960 |
| 2,950,178 | Halfter et al. | Aug. 23, 1960 |